US008479575B2

(12) United States Patent
Kempe (10) Patent No.: US 8,479,575 B2
(45) Date of Patent: Jul. 9, 2013

(54) MICROGYROSCOPE FOR DETERMINING ROTATIONAL MOVEMENTS ABOUT AN X AND/OR Y AND Z AXIS

(75) Inventor: Volker Kempe, Lieboch (AT)

(73) Assignee: Maxim Integrated Products GmbH, Planegg (DE)

( * ) Notice: Subject to any disclaimer, the term of this patent is extended or adjusted under 35 U.S.C. 154(b) by 0 days.

(21) Appl. No.: 13/203,554

(22) PCT Filed: Feb. 22, 2010

(86) PCT No.: PCT/EP2010/052179
§ 371 (c)(1),
(2), (4) Date: Aug. 26, 2011

(87) PCT Pub. No.: WO2010/097356
PCT Pub. Date: Sep. 2, 2010

(65) Prior Publication Data
US 2012/0048017 A1     Mar. 1, 2012

(30) Foreign Application Priority Data
Feb. 27, 2009  (DE) .................. 10 2009 001 244

(51) Int. Cl.
*G01C 19/00*    (2006.01)
(52) U.S. Cl.
USPC ..................................... 73/504.12
(58) Field of Classification Search
USPC ............... 73/504.12, 503.3, 504.02, 514.02, 73/514.32
See application file for complete search history.

(56) References Cited

U.S. PATENT DOCUMENTS

| | | | |
|---|---|---|---|
| 6,405,592 B1 * | 6/2002 | Murari et al. ................... 73/493 |
| 6,520,017 B1 * | 2/2003 | Schoefthaler et al. ...... 73/514.02 |
| 6,598,476 B2 * | 7/2003 | Terada et al. ............. 73/504.16 |
| 7,437,933 B2 * | 10/2008 | Durante et al. ............ 73/504.15 |
| 7,444,870 B2 * | 11/2008 | Uchiyama et al. ......... 73/504.12 |
| 8,176,779 B2 * | 5/2012 | Blomqvist ................. 73/504.12 |
| 2002/0189353 A1 * | 12/2002 | Knowles et al. ........... 73/504.12 |
| 2005/0081633 A1 * | 4/2005 | Nasiri et al. ............... 73/514.29 |
| 2006/0070441 A1 * | 4/2006 | Durante et al. ........... 73/504.12 |
| 2006/0156814 A1 * | 7/2006 | Blomqvist ................. 73/504.12 |
| 2007/0180909 A1 * | 8/2007 | Uchiyama et al. ......... 73/504.14 |
| 2007/0194857 A1 * | 8/2007 | Schwarzelbach ............. 331/23 |
| 2007/0214883 A1 * | 9/2007 | Durante et al. ............ 73/504.04 |
| 2007/0240508 A1 * | 10/2007 | Watson ..................... 73/504.12 |
| 2009/0260437 A1 * | 10/2009 | Blomqvist ................. 73/504.12 |
| 2009/0308201 A1 * | 12/2009 | Romano ....................... 74/84 R |
| 2010/0263446 A1 * | 10/2010 | Tamura et al. ............. 73/504.12 |
| 2011/0094301 A1 * | 4/2011 | Rocchi ..................... 73/504.08 |

* cited by examiner

*Primary Examiner* — Peter Macchiarolo
*Assistant Examiner* — Samir M Shah
(74) *Attorney, Agent, or Firm* — North Weber & Baugh LLP (57) ABSTRACT

The invention relates to a microgyroscope for determining rotational movements about an x-axis and/or a y-axis and a z-axis. Oscillating masses are fastened to a substrate by springs. Drive elements vibrate individual masses in an oscillatory manner in the x-y plane in order to produce Coriolis forces when the substrate is rotated, and sensor elements detect deflections of the masses on account of the Coriolis forces produced. The Individual masses are arranged in two groups that are jointly induced by the drive elements to carry out an oscillating primary movement in the plane of the x-y axis. The masses of the first group allow movements starting from the x-y plane, and the masses of the second group allow movements perpendicular to the oscillating primary movement in the plane of the x-y axis.

18 Claims, 5 Drawing Sheets

MICROGYROSCOPE FOR DETERMINING ROTATIONAL MOVEMENTS ABOUT AN X AND/OR Y AND Z AXIS

BACKGROUND OF THE INVENTION

This invention refers to a microgyroscope for determining rotational movements about an x and/or y and z axis, especially as a 3-D sensor, with a substrate, with several oscillating masses, with springs for fastening the oscillating masses to the substrate, and with drive elements for the oscillatory swinging of at least individual masses on the x, y axis in order to generate Coriolis forces by rotating the substrate, and with sensor elements for registering deflections of the masses owing to the generated Coriolis forces.

Micro-electro-mechanical (MEMS) gyroscopes are generally used for determining a rotational movement about an axis in an x-y-z system of coordinates. So rotational movements of the system about every one of the three axes can be determined, three such microgyroscopes are therefore needed. This is expensive and difficult to control, and the data are difficult to process too.

In order to create a three-dimensional gyroscope able to determine rotations in all three axes, D. Wood et al. suggested in the 1996 article "A monolithic silicone gyroscope capable of sensing about three axes simultaneously" the creation of a circular gyroscope with oscillatory masses arranged around a central anchor capable of determining tilting and rotational movements due to the occurring Coriolis forces. The disadvantage in this is the fact that the manufacture of such a sensor is difficult if not impossible, and the same can be said of how the moved masses should be driven. The designs of D. Wood et al. therefore remained merely theoretical.

In his article "Design and dynamics of an innovative microgyroscope against coupling effects, Nan-Chyuan Tsai also suggests a 3-D gyroscope. The disadvantage here is that an inner plate and an outer ring as well as four moved masses are available. The necessary spring constructions with low rigidity in two orthogonal rotational directions are prone to tolerance and difficult to build.

The task of this invention is therefore to build a very accurate, relatively economical 3-D micro gyro sensor that avoids the shortcomings mentioned above.

SUMMARY OF THE INVENTION

The task is solved with a microgyroscope that has the characteristics of claim 1.

The microgyroscope according to the invention has a substrate with oscillating masses fastened to it with the help of springs, plus drive elements and sensor elements. At least some of the individual oscillating masses are arranged in two groups; in each case, the masses of both groups can be jointly induced to make an oscillating primary movement in the plane of the x, y axis. The masses of the first group have been arranged on the substrate in such a way that they can move out of the x, y plane. The masses of the second group are arranged on the substrate in such a way that they can move perpendicularly to the oscillating primary movement in the x, y plane. Thus, the individual masses have been classified into two groups according to their functions, wherein the masses of the first group can be moved out of the x, y plane owing to the Coriolis forces that occur when the substrate is rotated. This takes place when the substrate or gyroscope is rotated about the x or y axis. A Coriolis force is generated as a reaction to this rotational movement of the substrate, and this force moves the masses of the first group out of the x/y plane. Depending on how the masses of the first group have been mounted, these masses are tilted or rotated about the x and/or y axis. When these masses are suspended in another way, a translateral movement in x direction can also take place. The masses of the second group react to a rotation of the substrate or gyroscope about the z axis as a reaction to the occurring Coriolis force and are moved within the plane of the x/y axis as secondary movement of the masses of the second group. This movement can, in turn, and depending on the way the masses of the second group are suspended, cause a rotation about the z axis or a translateral movement within the plane of the x/y axis.

The design of the microgyroscope according to the invention has the advantage that the individual masses are subdivided according to the respective secondary movements that need to be measured when they react to the Coriolis force. By dividing the masses, it is relatively easy to design the springs used for fastening these masses. Superimpositions of movements (i.e. the simultaneous movement of the masses both in the radial plane and also around one of the plane's rotational axis and at the same time about the z axis (as known from other 3-D microgyroscope designs) are not necessary in the design according to the invention. Springs that must at least have an exactly preset elasticity in more than one rotational or bending direction are not necessary. Couplings between the individual movement directions and the cross-coupling errors associated with them are therefore prevented. The individual masses can be mounted in such a way that they already react to small Coriolis forces. As a result of this arrangement, the sensor can react very quickly and precisely to rotational movements.

It is preferable if the masses of both groups for the oscillating primary movement can be moved radially towards a central point of the substrate. As a result of this, the sensor's size can remain small. Furthermore, the primary movement of the individual masses can be initiated in such a way that no unbalances occur. The movements and the resulting forces and torques offset each other, so that the primary movement does not generate an unintended secondary movement that would falsify the measurement results.

In an advantageous design of the invention, the masses of the first and second group are connected to each other rigidly in radial direction and elastically in tangential direction so the oscillatory primary movement can be synchronized. This connection can be made with synchronizing springs arranged between the masses of the first and second group. These synchronizing springs cause the individual masses (especially if they oscillate radially back and forth with regard to the center of the sensor) to be driven in a uniformly pulsating way, thus largely preventing a phase shift of the individually driven masses. The system thereby works synchronously and no undesired forces or torques occur.

In an especially advantageous design of the invention, the masses of the first group are two pairs of masses, from which one pair is arranged on the x axis and the second pair on the y axis. A balanced system is therefore created as a result of this and it can be analyzed very easily with regard to the secondary movements that occur. Coriolis forces occurring as a reaction to the substrate's rotational movements about the x or y axis generate forces in positive and negative z direction and with them, tilting moments and the corresponding secondary movements of the mass pairs about the y or x axis, so that the sensor elements arranged on the respective masses can register their secondary movement very easily. The electric signals from these sensor elements allow one to draw conclusions about the substrate's rotational movement about the x or y axis.

If the second group consists of at least two masses or preferably of a multiple thereof, this ensures that the system will not generate torques caused by the primary or secondary movements that could falsify the measurement results.

In an especially advantageous arrangement, the masses of the second group are located between the masses of the first group and in each case are especially placed offset by 90°. In this arrangement, the masses of the first group are on the x or y axis, whereas the masses of the second group are in each case arranged offset by 45° between the x and y axis. In this arrangement, the Coriolis forces resulting from a rotation of the substrate about the x or y axis also cause preferably a tilting movement of the masses of the first group on the x or y axis about the y or x axis while a rotation of the substrate about the z axis perpendicular to the masses generate Coriolis forces that act on the masses of the second group. Depending on design, these can be transformed and registered as a movement of the masses of the second group in form of a rotation about the z axis or in form of a movement lying on the plane perpendicular to the radial movement. The occurring Coriolis forces and the deflection of the respective masses taking place because of this can be determined relatively easily with sensor elements assigned to the respective masses. Thus, superimpositions of the movements of the individual elements, which should have to be mathematically separated, and complex suspensions of the individual masses are not necessary.

Preferably, the masses of the first group are flexibly arranged in x and/or y direction on an inner and/or outer frame. As a result of this, the masses of the first group are, on the one hand, stably suspended and, on the other hand, nonetheless still capable of being moved in a predetermined way. Especially for driving the masses of the first group (which in a preferred design of the invention this driving takes place in x or y direction), this primary movement is especially easy to attain by flexibly attaching the masses of the first group on an inner and outer frame. The springs used for arranging the masses of the first group on the inner or outer frame can be very easily designed because they must only be flexible in one direction and rigid in the other directions.

It is particularly easy to attach the masses of the first group when they are flexibly arranged in radial direction on a rigid strut or auxiliary web. The strut or auxiliary web, for example, makes the link to the inner or outer frame possible. The masses of the first group can hereby be designed in such a way that they can be optimally integrated into the sensor with regard to their mass and form.

If the inner frame is arranged in one or several mostly central anchor(s), in an advantageous design of the invention the flexibility of the first group of masses (mounted on the inner frame and which should be available in radial direction) can be uncoupled by a rotational movement that—as a secondary movement—moves the inner frame with regard to the central anchor. As a result of this, the individual springs are relatively easy to design because they must merely be flexible in one direction for the masses of the first group and, on the other hand, the springs that attach the inner frame to the central anchor also have to be flexible in only one direction. This clear spring design with characteristics that do not contradict each other and in each case need flexibility in only one direction allow clear movements without cross-coupling effects. The measurement results of the sensor elements that register the movements of the individual elements or mass systems can be unequivocally determined and evaluated because of this.

Especially when the inner and/or outer frame is/are gimbally mounted on one or several anchor(s) for the tilting movement of the masses of the first group about the x or y axis, it is possible that the mass pairs mounted onto the frame can be rotatably deflected around the y axis and x axis as a reaction to the Coriolis forces. This also allows an uncoupling of the individual movement directions, thereby greatly simplifying the analysis of the movements and making it accurate.

A particularly accurate analysis of the secondary movements can therefore take place because according to an advantageous execution of the invention, the gimbal mounting of the inner and outer frame is flexible around the same tilting axes, but mostly rigid with regard to linear movements. This arrangement clearly creates a system that allows movements in only one rotational direction. Linear movements that would superimpose the rotational movements and thereby make the analysis of the movements harder or even falsify it are prevented because of this.

To determine a rotational movement of the gyroscope about the z axis, it is advantageous if at least parts of the masses of the second group are arranged in such a way that they are rotatable about the z axis or deflectable in a right angle to the radial arrangement of the masses of the second group. As a result of this, a reaction to occurring Coriolis forces and a movement of the masses of the second group about the z axis or in translateral direction perpendicular to the radial arrangement of the masses of the second group can be analyzed. Correspondingly arranged sensor elements determine the secondary movement of the masses of the second group and generate an electric signal proportional to the rotational movement of the gyroscope's substrate.

The microgyroscope can be very advantageously designed when the masses of the second group have an oscillating frame for suppressing the secondary movement with which a partition mass is linked that takes over the frame's primary movements and can also execute the secondary movements. Through this, in turn, the individual movement directions are uncoupled. The primary movement of the masses of the second group needs a flexible suspension of the frame on the substrate in the drive direction, whereas the suspension is largely rigid in the other directions.

If in another advantageous design of the invention the partition mass is fastened to the oscillating frame in such a way that this partition mass can be deflected perpendicularly to the frame's oscillating movement, then the secondary movement is merely initiated on the partition mass. The movement of the partition mass perpendicular to the oscillating drive movement can thus be registered and analyzed relatively easily. This execution, in turn, also allows the easy design of the elastic suspension of frame and partition mass. The individual springs for mounting the frame and the partition mass to each of the higher components need to be flexible in only one direction, but they can be rigid in the other directions. The design of the springs is therefore easy and clear with regard to their degree of freedom.

It is advantageous if the first sensor elements for determining the deflection of the oscillating masses of the first group are arranged below them. In this case, they can be, for example, horizontally arranged plate capacitors that generate a changing electrical signal by changing the distance of the individual plates. As a result of this, the deflection of the oscillating masses of the first group is registered, providing possible indications to a corresponding rotational movement of the microgyroscope. Naturally, other kinds of sensor elements can be used; for example, horizontally arranged electrodes or a deflection of the oscillating masses of the first group can also generate a corresponding signal.

To register a deflection of the masses or of the partition masses of the second groups, it is advantageously possible to arrange second sensor elements for registering this movement of the masses or partition masses. In this arrangement, it is also advantageous for the sensor elements and the masses of the first group to be divided. One part of the sensor elements is firmly arranged on the substrate, while another part is located on the movable mass. The relative movement of both parts of the sensor elements to one another generates a changeable electric signal that indicates the movement of the masses.

For moving the oscillating masses of the first and second group, it is advantageous to have electrodes, especially fork electrodes. When an alternating voltage runs through it, the masses are mutually attracted in radial direction to the central suspension or repelled, thus initiating an oscillatory movement.

An especially advantageous execution of the microgyroscope will now be described.

The advantage of the execution is that on the central suspension around which two groups of tilting axes have been movably placed on a central anchor, two groups of oscillating masses are arranged in such a way that they are jointly induced to perform a synchronized, radial primary movement and that the at least two partial masses of the first group of oscillating masses arranged in pairs react through tilting movements to the sensor's rotations about axes lying on the plane, and the second group of masses or parts can execute these movements perpendicularly to the radial deflection as a reaction to the Coriolis forces caused by rotations about the z axis.

In the simplest and preferred case, the first group of masses consists of four plate segments, in each case shifted against one another by 90°, from which in each case the opposing ones form a pair for detecting the rotation about the x axis or y axis, and the second group—which also consists in each case of four plate segments shifted against one another by 90°—that jointly register the deflections perpendicular to the radius caused by the z rotation.

A possibly usable second external suspension for the movable masses is, like the central suspension, flexible around the same tilting axes as the inner suspension, but stationary with regard to the linear movements and serves for increasing the gyroscope's shock and vibration resistance.

The registration of the deflections caused by the Coriolis forces is done by sensor elements allocated to the oscillating masses. With them, linear deflective movements and/or tilting movements of the masses are registered. The inner suspension can have a different design, but it is essential that the oscillating masses of the first group can, on the one hand, execute a radial movement to and from the central suspension, which is achieved by the corresponding elastic links to the central suspension or, according to the invention, by elastic links to rigid struts or auxiliary webs, rigidly linked to the central suspension, and that on the other hand can also execute in pairs one of the two orthogonal tilting movements about the central anchor.

The masses of the second group are elastically connected to the substrate and to the neighboring masses of the first partial group through synchronization springs, so that on the one hand their primary oscillation takes place synchronously with all other masses, and on the other hand the masses can execute a movement perpendicular to it in addition to the radial movement.

There is another advantageous design possibility in this, namely that every one of the partial masses of the second group can be subdivided into a radially oscillating frame and a partition mass connected in such a way that the latter is able to execute a secondary movement running perpendicularly to the radius that is caused by the Coriolis force of the z rotation. In this case, the dimensioning of the synchronization springs is especially easy because they have only a single defined elasticity in tilting direction, but must be as rigid as possible in all other degrees of freedom.

The arrangement described above allows, on the one hand, the oscillating masses to be used as drive masses and, on the other hand, to transfer the movements caused by the Coriolis forces to the corresponding masses. This arrangement allows one to determine gyroscope rotations, i.e. especially of the substrate around an x and/or y and z axis together with the allocated sensor elements.

Advantageously and non-restrictively, the sensor elements for determining the deflection of the oscillating masses of the first group are arranged, according to the state of the art, below the oscillating masses, i.e. between the oscillating masses and the substrate. In this arrangement, the sensor elements can—if they are of the capacitive type, for example—determine a deflection of the oscillating masses by changing the voltages. The sensor elements for registering a rotational movement of the masses of the second group can either consist of capacitive sensors likewise connected to these masses or of other equivalent sensors for determining a change in spacing running perpendicularly to the radius.

It is particularly advantageous when the external suspension surrounds the oscillating masses as a ring-shaped frame or one designed otherwise. At the same time, this permits an elastic connection of the oscillating masses on their external perimeter on the outer suspension in the same way as on the inner suspension directly or through the rigid webs.

Since the outer suspension is anchored rigidly to the substrate in all three directions with regard to linear deflections and can only execute torsion movements around two tilting axes, a particularly stable system that especially resists external shocks is the result of this.

It is preferable for the inner anchor to be centrally arranged so a good and uniform deflection of the masses in radial direction is allowed and the masses of the first group can at the same time deflect in one of both tilting axes.

In an especially advantageous design of the invention, the central suspension is executed like a simple gimbal suspension that allows a swinging movement of the mass pairs of the first group about the x or y axis.

So the oscillating masses can be designed to move in radial direction, it is advantageous for the oscillating masses of the first group to be fastened directly to the central plate with springs or very advantageously via the rigid webs. The same applies, if need be, for the fastening to the outer suspension, which can likewise be advantageously executed as a gimbal suspension.

So the oscillating masses of the second group can be executed so they can move in radial direction, it is advantageous to connect them or the partial frames that support the perpendicularly-moving partition partial masses to the substrate with elastic springs moving in radial direction. Preferably, the springs should be executed as rigidly as possible in z direction so they can prevent a movement of the oscillating masses in z direction.

To force the oscillating masses to a common synchronous radial movement, it is advantageous to arrange the partial masses of the first and second group alternately along the circumference and to connect them with synchronization springs executed as rigidly as possible in radial direction. The synchronizing springs allow, on the one hand, certain elasticity around the anchor in circumferential direction to ensure that the oscillating masses can be separated slightly from each other during their linear radial movement. On the other hand, however, they interfere with the oscillating masses provided they are inclined to swing non-uniformly and simultaneously outwards and inwards.

According to the state of the art, electrodes (especially fork or comb electrodes) are preferred for driving the oscillating masses because they induce the oscillating masses to swing and cause them to swing in a specific way with a predetermined frequency.

In accordance with an especially preferred execution of the invention, the microgyroscope has sensor elements for recording the deflection of the masses (5) or of the partition masses (11) that are arranged in a detection box (23) with shield electrodes (25) for the counter electrodes (24) fixed on the substrate. The shield electrodes create constant edge sections, which make the accuracy of the measurement of the secondary movements possible.

BRIEF DESCRIPTION OF THE DRAWINGS

Further advantages of the invention and more inventive ideas are described with the help of the embodiments, which show:

FIG. 1 a schematic view of a possible inventive design, which at the same time is the gyroscope's working principle, FIG. 2 an embodiment for designing the masses of the first group and their suspension, FIG. 3 an embodiment for designing the masses of the second group and their suspension, FIG. 4 an embodiment of the inner suspension, FIG. 5 an embodiment of the capacitive determination of the z rotation, FIG. 6 a detail of the capacitive determination of the z rotation or the corresponding movement perpendicular to the radius, FIG. 7 another embodiment of the invention.

DETAILED DESCRIPTION OF THE INVENTION

Figure 1:
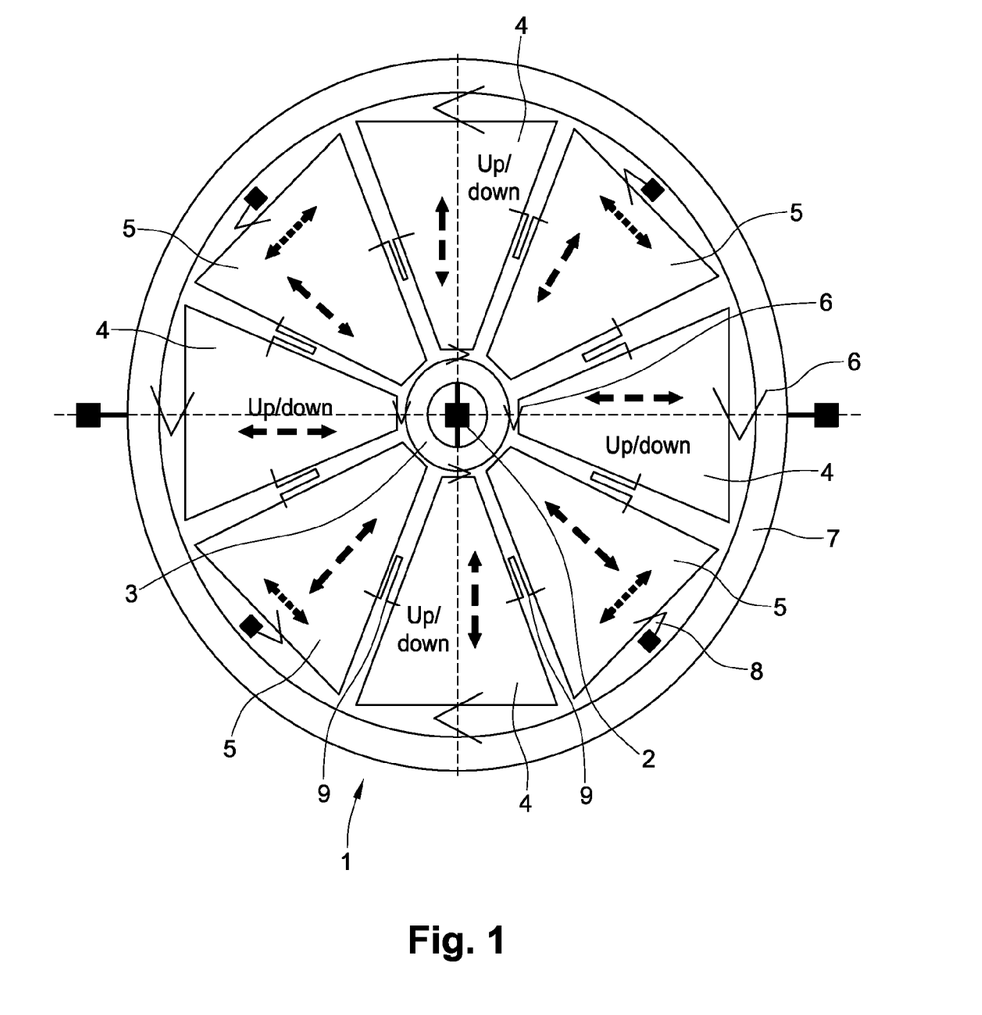

FIG. 1 shows a possible embodiment of a microgyroscope 1 according to the invention. In a central anchor 2 mounted on a substrate lying on the drawing plane, above a disc-shaped inner suspension 3 shaped like an inner frame, eight oscillating drive masses 4 and 5 have been arranged that form two groups whose representatives are in each case offset to each other by 90°. The masses 4 of the first group are fastened onto the inner suspension 3 and onto an outer suspension 7 (to be advantageously provided) by means of symbolically indicated (drive) springs 6, but the outer suspension can also be left out. Both suspensions 3 and 7 can also have other forms in addition to the ring shape (a square one, for example).

The springs 6 of the masses 4 of the first group are elastic in radial direction and as rigid as possible in all other degrees of freedom. In this embodiment, the four masses 5 of the second group are connected to the substrate with springs 8, and these springs 8 are elastic in radial and perpendicular direction plus as rigid as possible in all other degrees of freedom.

The springs 6 of the masses 4 of the first group thus allow a radial oscillation generated by the corresponding drive elements and the transfer of the Coriolis forces that occur in phase opposition in the opposing masses of a pair in form of a torque acting on the inner and, if applicable, outer suspension 3, 7, capable of executing the two tilting movements about both orthogonal axes x and y. FIG. 1 symbolically shows only one of the two tilting axes of the suspensions 3, 7—to be more precise, the one about the horizontal tilting axis The springs 8 of the masses 5 of the second group connected to the substrate also allow a radial oscillation generated or supported by the respective drive elements, and in addition to it an orthogonal movement transversal to the radius too.

The synchronization springs 9 force all eight masses 4, 5 of both groups to make a radial synchronous movement. These synchronization springs 9 compensate not only for the inequalities in the individual masses 4, 5 and spring constants but also in the size of the synchronously acting driving forces. The drive elements, which can be advantageously executed as comb structures, are not shown here.

If anti-parallel Coriolis forces impinge in pairs on the drive masses 4 of the first group through rotations along the plane, then they will generate a torque on the inner suspension 3 and therefore the corresponding tilting movements. If the drive masses 5 of the second group are impinged with Coriolis forces through rotations about the z axis, then same-direction secondary oscillations of all four masses 5 perpendicular to the radial movement will occur.

The synchronizing springs 9 arranged between the eight masses 4, 5 are executed in a way they can support a synchronous swinging of the drive masses 4, 5, thus allowing certain rotation when the gap between two drive masses 4, 5 becomes wider, when the drive masses 4, 5 creep outwards, and when the gap becomes smaller because the drive masses 4, 5 are moved once again towards the center. On the other hand, the synchronizing springs 9 remain rigid in case the drive masses 4, 5 would try to oscillate unevenly.

Figure 2:
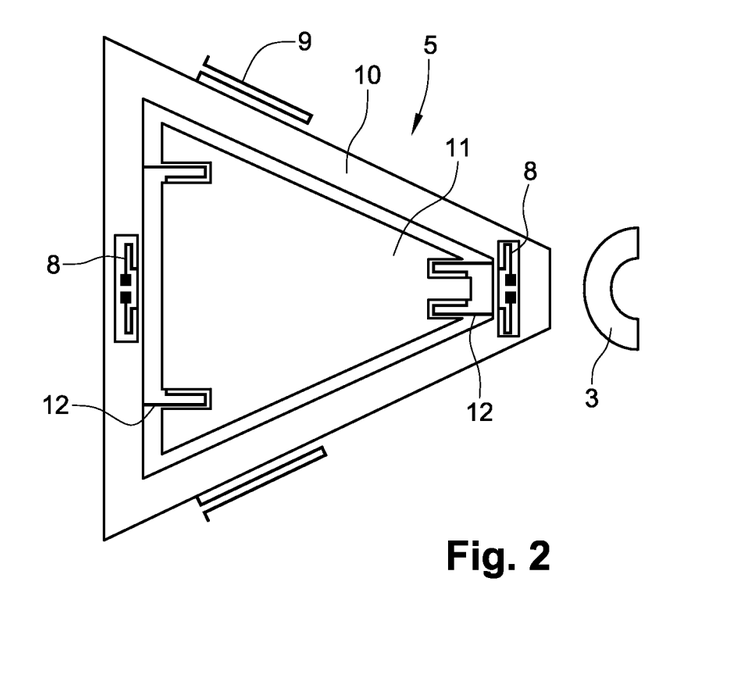

In the masses 5 and springs 8 of the second group executed as shown in FIG. 1, the synchronization springs 9 also act on the secondary movement of the masses 5 of the second group. This is prevented by executing the masses 5 of the second group as a separated drive frame 10 and embedded partial masses 11, as seen in FIG. 2. The partial masses 11 are connected to their respective drive frame by means of secondary movement springs 12. As a result of this, a clean separation of the function of the drive springs 8 and the secondary movement springs 12 is achieved too, and the inevitable cross couplings that occur with spring constructions having two degrees of freedom is prevented by introducing two spring pairs 8, 12 with a well-controlled degree of freedom. FIG. 2 shows an advantageous design of the masses 5 of the second group and its spring groups 8 and 12.

Sensor electrodes able to determine a change of separation in z direction are arranged below the masses 4 of the first group and, if need be, below the corresponding parts of the outer suspension 7. These sensor electrodes can consist of plates having a capacitive effect that determine a tilting movement around the axes x, y lying on the drawing plane.

Figure 3:
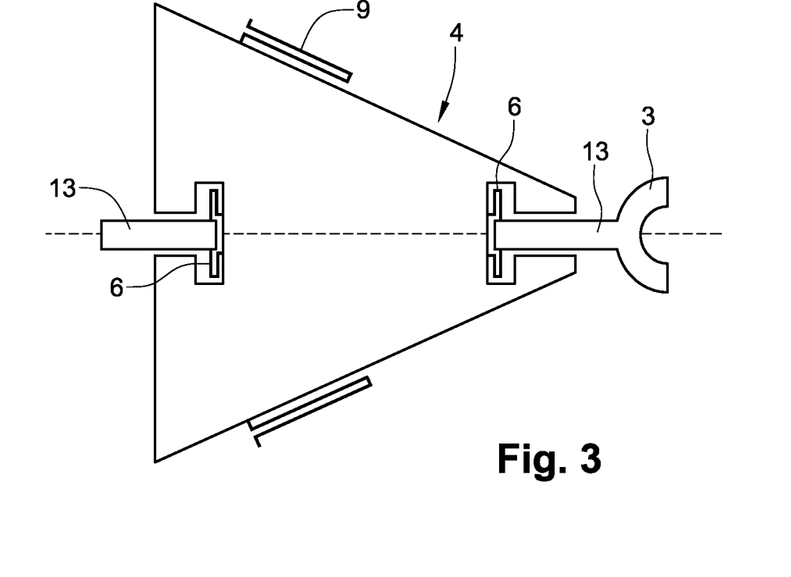

FIG. 3 shows an advantageous design of the masses 4 of the first group and their springs 6. Especially favorable here is the introduction of struts or auxiliary webs 13 to allow the efficient transformation of the Coriolis forces acting in z direction to a torque. The influence of the limited torsion-proof capability of the drive springs 6, which leads to mutual torsions against each other when the springs 6 are arranged between the masses 4 and the inner suspension 3, is greatly reduced here and an efficient transformation of the Coriolis forces into the tilting moment is achieved in this way.

In case the outer suspension 7 is missing, it is a good idea to connect the two drive springs 6 or drive spring pairs near the inner and outer edge of the masses 4 to the inner suspension 3 with a correspondingly extended auxiliary web.

Figure 4:
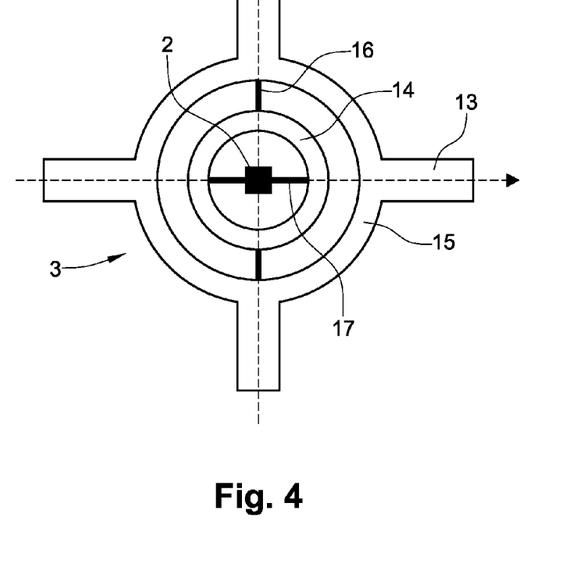

FIG. 4 shows an embodiment of the inner suspension 3. Two—in this case, ring-shaped—frames 14, 15 are connected to each other with a pair of torsion springs 16, and the inner frame 14 to the central anchor 2 with a pair of torsion springs 17. From the outer frame 15 of the inner suspension 3, the four struts 13 branch off towards the springs of the masses 4 of the first group. The masses 5 of the second group are not connected to the inner suspension 3.

Figure 5:
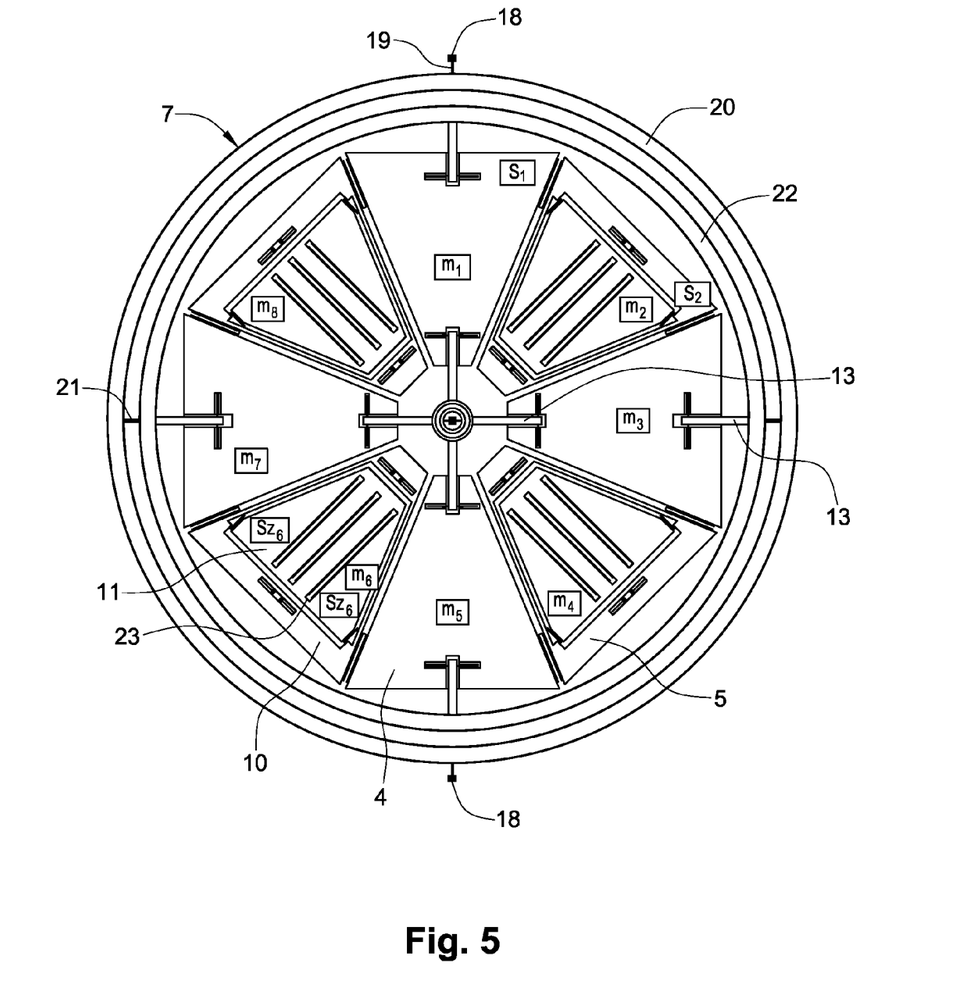

In accordance with FIG. 5, an outer suspension 7 can be executed as a gimbal suspension analogously to the inner one, but with the difference that the inner central anchor 2 is replaced by two outer anchors 18 in the torsion springs 19 of the outer frame 20. The outer frame 20 of the outer suspension 7 is connected to an inner frame 22 by means of a torsion spring 21. The struts 13 of the masses 4 of the first group are fastened to the inner frame 22.

Figure 6:
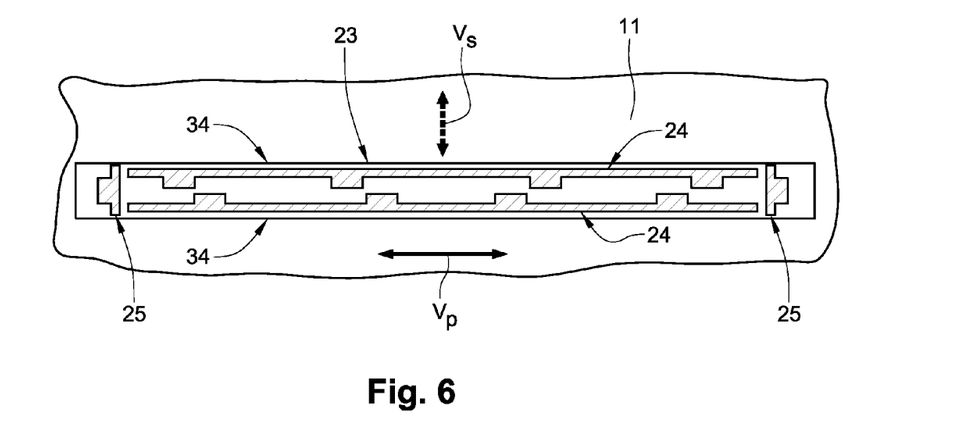

FIGS. 5 & 6 show a possible design of the detection capacities for determining the movement perpendicular to the radial drive movement of the masses 5 of the second group. The partition masses 11 embedded elastically in the drive frame 10 in a direction perpendicular to the radius according to FIGS. 2, 5 or 7 have detection boxes 23. According to FIG. 6, these are simple recesses in the partition mass 11 (whose inner walls represent electrodes 34 of the movable partial masses 11) located opposite to anchored counter electrodes 24 isolated on the substrate, so that movements of the detection box 23 lead to measurable changes in capacity in the direction of the secondary movement $v_s$ perpendicular to the radius. To prevent the influence from the radial primary movement $v_p$ on the right and left changing edge sections in box 23, shield electrodes 25 having the same potential of the moved mass 11 can be used, thus guaranteeing constant edge sections.

Needless to say, such detection boxes 23 can also be used in sensor elements without a partition mass 11. Here, the shield electrodes 25 also prevent interferences while the secondary movements are measured.

Sensor 1 is manufactured with the known micromachining technique. The two groups of driven masses 4 and 5 are an essential feature of the invention, in which case each one of the two groups contains four or more individual masses.

All masses 4, 5 are synchronously driven, whereby every one of the masses 4, 5 of both groups changes its rotational movement in different directions under the influence of external rotational velocities.

One mass pair 4 of the first group executes a synchronous secondary movement whose resonance frequencies should be advantageously as identical as possible and should be located near the common primary resonance of all masses. The primary resonance of the masses 5 of the second group should be likewise advantageously set near the common primary resonance.

The secondary resonances of the masses 5 of the second group do not need to be synchronized. The same applies to the matching of both secondary resonances of the first group pairs. An achievable matching within the limits of the manufacturing tolerances is sufficient for a stable total sensitivity to turns about all three axes.

Figure 7:
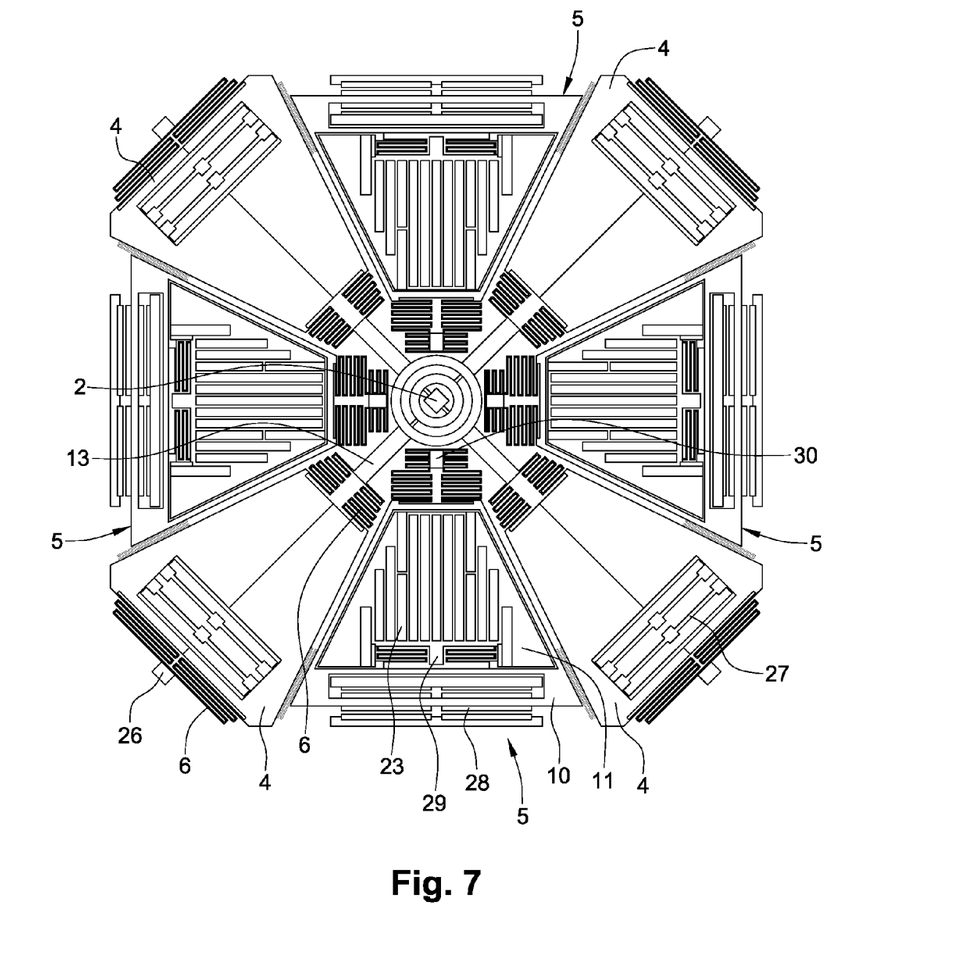

FIG. 7 shows another embodiment of the invention. Here, the masses 4 of the first group are not connected to each other with the help of an outer frame. Every one of the masses 4 of the first group, on the other hand, is fastened to the substrate with an anchor 26 and the strut 13. The springs 6, which fasten the masses 4 to the anchor 26 and the strut 13, allow a drive movement in oscillating, radial direction with regard to the central anchor 2, furthermore a movement out of the x, y plane, especially a tilting movement around the central anchor 2. The masses 4 of the first group are set in their primary motion with drive electrodes 27. Drive electrodes 28 move the drive frame 10 of the masses 5 of the second group in an oscillating way too, in radial direction with regard to the central anchor 2. The drive frame 10 is movably and radially fastened to the substrate by means of an outer anchor 29 and an inner anchor 30. The movement of the partial mass 11, which is elastically arranged transversally to the drive direction of the drive frame 10, is detected by the detection box 23.

The invention is not restricted to the embodiments shown. Other embodiments within the framework of the wording of the patent claims and the description are possible. Combinations and executions of individual structural parts of the embodiments among themselves are possible at any time.

The invention claimed is:

1. A microgyroscope for determining rotational movements about an x-axis and/or a y-axis, and a z-axis, the microgyroscope comprising:
    a substrate;
    a plurality of oscillating masses comprising individual masses arranged around a central point on the substrate;
    a plurality of springs for fastening the plurality of oscillating masses to the substrate;
    a plurality of drive elements for inducing radial oscillation of the individual masses on an x-y plane, with respect to the central point, in order to generate Coriolis forces when the substrate rotates; and
    a plurality of sensor elements for registering deflections of the individual masses caused due to the generated Coriolis forces;
    wherein the individual masses are arranged in two groups comprising a first group and a second group, the masses of both groups being jointly induced by the plurality of drive elements to perform an oscillating primary movement in the x-y plane, the masses of the first group being arranged on the substrate so as to allow movements out of the x-y plane, the masses of the second group being arranged on the substrate so as to allow movements perpendicular to the oscillating primary movement in the x-y plane.

2. The microgyroscope according to claim 1, wherein the masses of both groups are elastically coupled to one another for synchronization of the oscillating primary movement.

3. The microgyroscope according to claim 1, wherein the masses of the first group comprise two pairs of masses arranged on the x-axis and on the y-axis.

4. The microgyroscope according to claim 1, wherein the masses of the second group comprise at least two masses.

5. The microgyroscope according to claim 1, wherein the masses of the second group are arranged between the masses of the first group, wherein each of the masses in the second group are substantially offset from corresponding masses of the first group by 90°.

6. The microgyroscope according to claim 1, wherein the masses of the first group are flexibly arranged in a radial direction on a rigid strut or an auxiliary web.

7. The microgyroscope according to claim 1, wherein the masses of the first group are flexibly arranged in an x-axis direction or a y-axis direction on a frame selected from an inner frame and an outer frame.

8. The microgyroscope according to claim 7, wherein the inner frame is arranged on at least one central anchor.

9. The microgyroscope according to claim 7, wherein the inner frame and/or the outer frame is gimbally mounted on at least one anchor for the tilting movement of the masses of the first group about the x-axis and/or the y axis.

10. The microgyroscope according to claim 9, wherein the gimbally mounting of the inner frame and/or the outer frame is flexible about the same tilting axes, but substantially rigid with regard to linear movements.

11. The microgyroscope according to claim 1, wherein a subset of the masses of the second group is mounted in such a way that the subset of the masses is rotatable about the z-axis or can be deflected perpendicularly to the radial arrangement.

12. The microgyroscope according to claim 1, wherein first sensor elements for registering the deflection of the oscillating masses of the first group are arranged below the plurality of oscillating masses.

13. The microgyroscope according to claim 1, wherein the masses of the second group have an oscillating frame and a partition mass coupled to the oscillating frame.

14. The microgyroscope according to claim 13, wherein the partition mass is fastened to the oscillating frame in such a way that the partition mass can be deflected perpendicularly to an oscillating movement of the oscillating frame.

15. The microgyroscope according to claim 13, wherein second sensor elements for registering the deflection of the masses of the second group or of the partition mass of the second group are provided.

16. The microgyroscope according to claim 13, wherein sensor elements for registering the deflection of the masses of the second group or of the partition mass of the second group are arranged in a detection box with shield electrodes for counter electrodes fixed on the substrate.

17. The microgyroscope according to claim 1, wherein the plurality of drive elements of the plurality of oscillating masses are a plurality of electrodes.

18. The microgyroscope according to claim 17, wherein the plurality of drive elements of the plurality of oscillating masses are a plurality of fork electrodes.

* * * * *